United States Patent
Hishida et al.

(10) Patent No.: US 11,393,335 B2
(45) Date of Patent: Jul. 19, 2022

(54) POWER TRANSFER MANAGING APPARATUS, AND COMPUTER-READABLE STORAGE MEDIUM

(71) Applicant: HONDA MOTOR CO., LTD., Tokyo (JP)

(72) Inventors: Motoki Hishida, Saitama (JP); Hakaru Sadano, Saitama (JP); Hiroyuki Kanazawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 251 days.

(21) Appl. No.: 16/726,797

(22) Filed: Dec. 24, 2019

(65) Prior Publication Data
US 2020/0234575 A1   Jul. 23, 2020

(30) Foreign Application Priority Data
Jan. 17, 2019 (JP) ............................. JP2019-006024

(51) Int. Cl.
*G08G 1/01* (2006.01)
*B60L 50/60* (2019.01)

(52) U.S. Cl.
CPC ............ *G08G 1/0145* (2013.01); *B60L 50/60* (2019.02); *G08G 1/0112* (2013.01)

(58) Field of Classification Search
CPC .... G08G 1/0145; G08G 1/0112; B60L 50/60; B60L 2240/72; B60L 2240/622; G01C 21/343
See application file for complete search history.

(56) References Cited

U.S. PATENT DOCUMENTS

| | | | | |
|---|---|---|---|---|
| 8,103,386 B2 * | 1/2012 | Ichikawa | ................ | B60L 53/20 700/297 |
| 8,330,415 B2 * | 12/2012 | Sato | ........................ | B60L 53/60 320/109 |
| 8,825,354 B2 * | 9/2014 | Horita | ...................... | B60Q 9/00 701/118 |
| 9,121,720 B2 * | 9/2015 | Kim | .................... | G01C 21/3469 |
| 9,333,873 B2 * | 5/2016 | Mori | ........................ | B60L 53/35 |

(Continued)

FOREIGN PATENT DOCUMENTS

| | | | | |
|---|---|---|---|---|
| CN | 106064568 A | * | 11/2016 | |
| FR | 2734659 A1 | * | 11/1996 | .......... B60L 11/1846 |

(Continued)

OTHER PUBLICATIONS

Office Action issued for counterpart Japanese Application No. 2019-006024, issued by the Japanese Patent Office dated Mar. 23, 2021 (drafted on Mar. 9, 2021).

(Continued)

*Primary Examiner* — Luis A Martinez Borrero

(57) ABSTRACT

A power transfer managing apparatus includes: a traffic jam information acquiring unit that acquires traffic jam information including a position where a traffic jam occurs; and a notification control unit that makes a user of a vehicle that is provided with a driving power source notified of information indicating a second route via a geographical point where power transfer can be performed between the vehicle and a power network if the traffic jam occurs on a route allocated to the vehicle.

11 Claims, 8 Drawing Sheets

(56) References Cited

U.S. PATENT DOCUMENTS

| | | | | |
|---|---|---|---|---|
| 9,340,117 B2* | 5/2016 | Momose | .................. | H02J 3/32 |
| 9,627,911 B2* | 4/2017 | Kinomura | ............ | B60L 3/0046 |
| 9,714,837 B2* | 7/2017 | North | .................. | G01C 21/367 |
| 9,739,624 B2* | 8/2017 | Rajagopalan | ............ | B60L 58/12 |
| 10,288,439 B2* | 5/2019 | Pedersen | ............. | G05D 1/0088 |
| 10,511,171 B2* | 12/2019 | Kudo | ........................ | H02J 3/32 |
| 10,612,933 B1* | 4/2020 | Ledet | ................. | G01C 21/3469 |
| 11,075,528 B2* | 7/2021 | Kitaoka | .................. | B60L 53/00 |
| 2003/0028322 A1 | 2/2003 | Ogawa | | |
| 2006/0142915 A1* | 6/2006 | Isono | .................... | B60W 10/06 |
| | | | | 701/1 |
| 2010/0094496 A1* | 4/2010 | Hershkovitz | ........... | B60L 53/14 |
| | | | | 701/22 |
| 2011/0032110 A1* | 2/2011 | Taguchi | ............. | G01C 21/3697 |
| | | | | 340/636.1 |
| 2011/0213520 A1* | 9/2011 | Yaguchi | .................. | B60L 53/64 |
| | | | | 701/22 |
| 2012/0032637 A1* | 2/2012 | Kotooka | ................. | B60L 50/61 |
| | | | | 320/109 |
| 2012/0035795 A1* | 2/2012 | Yu | ......................... | B60W 20/12 |
| | | | | 180/65.265 |
| 2012/0083932 A1* | 4/2012 | Ramaswamy | ............ | H02J 3/06 |
| | | | | 700/291 |
| 2012/0112696 A1* | 5/2012 | Ikeda | ...................... | H02J 7/007 |
| | | | | 320/109 |
| 2012/0249068 A1* | 10/2012 | Ishida | ....................... | H02J 3/32 |
| | | | | 320/109 |
| 2012/0253655 A1* | 10/2012 | Yamada | .................. | B60L 58/12 |
| | | | | 340/870.07 |
| 2013/0162025 A1* | 6/2013 | Momose | ................. | B60L 53/52 |
| | | | | 307/9.1 |
| 2013/0169233 A1* | 7/2013 | Tonegawa | ................ | B60L 3/12 |
| | | | | 320/134 |
| 2013/0184882 A1* | 7/2013 | Momose | ................. | B60L 53/64 |
| | | | | 700/286 |
| 2013/0226441 A1* | 8/2013 | Horita | ...................... | B60Q 9/00 |
| | | | | 701/117 |
| 2014/0077766 A1* | 3/2014 | Takeuchi | ................ | B60L 55/00 |
| | | | | 320/128 |
| 2014/0336965 A1* | 11/2014 | Mori | ....................... | B60L 58/12 |
| | | | | 702/63 |
| 2015/0054466 A1* | 2/2015 | Kinomura | ............... | B60L 55/00 |
| | | | | 320/134 |
| 2015/0283912 A1* | 10/2015 | Shimizu | ................ | B60L 53/665 |
| | | | | 320/157 |
| 2016/0001671 A1* | 1/2016 | Mori | ....................... | B60L 58/12 |
| | | | | 701/22 |
| 2016/0257296 A1 | 9/2016 | Fukui | | |
| 2018/0205230 A1* | 7/2018 | Kudo | .................... | H02J 7/0027 |
| 2018/0238698 A1* | 8/2018 | Pedersen | ................ | B60L 58/16 |
| 2018/0241229 A1* | 8/2018 | Kitaoka | .................. | B60L 53/65 |
| 2019/0107406 A1* | 4/2019 | Cox | ......................... | G01S 19/42 |
| 2020/0282855 A1* | 9/2020 | Slutzky | .................. | B60L 58/16 |
| 2021/0046840 A1* | 2/2021 | Brombach | ................ | H02J 7/00 |
| 2021/0300184 A1* | 9/2021 | Homma | .................. | B60L 3/0046 |
| 2021/0334719 A1* | 10/2021 | Hishida | ............. | G01C 21/3469 |
| 2021/0334915 A1* | 10/2021 | Hishida | .................. | G06Q 50/06 |

FOREIGN PATENT DOCUMENTS

| | | | |
|---|---|---|---|
| JP | 2003042789 A | | 2/2003 |
| JP | 2011094995 A | | 5/2011 |
| JP | 2011174711 A | | 9/2011 |
| JP | 2011247816 A | | 12/2011 |
| JP | 2013178884 A | * | 9/2013 |
| JP | 5578124 B2 | | 8/2014 |
| JP | 2015077856 A | | 4/2015 |
| JP | 5714073 B2 | | 5/2015 |
| JP | 2015094695 A | | 5/2015 |

OTHER PUBLICATIONS

Office Action issued for counterpart Japanese Application No. 2019-006024, issued by the Japanese Patent Office dated Nov. 24, 2020 (drafted on Nov. 17, 2020).

* cited by examiner

| | RECOMMENDATION 1 | DISTANCE | TIME REQUIRED | BENEFIT | |
|---|---|---|---|---|---|
| 1 | VIA PUBLIC BATH COMPLEX A | 50km | 3 HRS 30 MIN (2-HR STAY) | 100 PTS/ 2 HRS | SELL POWER ¥15/kwh — TICKET FOR PUBLIC BATH |
| 2 | VIA SHOPPING MALL B (RECOMMENDATION 2) | 55km | 3 HRS 50 MINS (2-HR STAY) | 110 PTS/ 2 HOURS | BUY POWER ¥10/kwh — 10% DISCOUNT VOUCHER |
| 3 | (JAMMED) SHORTEST ROUTE | 45km | 2 HRS 10 MINS | 0pt | *** |

*FIG. 4*

| VEHICLE ID | STATION ID | SCHEDULED PERIOD | POINTS | UNIT PRICE |
|---|---|---|---|---|
| V100 | S001 | 2018/10/1 18:00 ~ 2018/10/1 22:00 | 100/2 HOURS | SELL POWER ¥15/kwh |
| ⋮ | ⋮ | ⋮ | ⋮ | ⋮ |

*FIG. 5*

| VEHICLE ID | STATION ID | CONNECTION START TIME | CONNECTION END TIME | POINTS | POWER TRANSFER AMOUNT | FEE |
|---|---|---|---|---|---|---|
| V100 | S001 | 2018/10/1 19:10 | 2018/10/1 21:20 | 100 | −12kWh | −180 |
| ... | ... | ... | ... | ... | ... | ... |

*FIG. 6*

POWER TRANSFER MANAGING APPARATUS, AND COMPUTER-READABLE STORAGE MEDIUM

The contents of the following Japanese patent application are incorporated herein by reference: 2019-006024 filed on Jan. 17, 2019.

BACKGROUND

1. Technical Field

The present invention relates to a power transfer managing apparatus, and a computer-readable storage medium.

2. Related Art

Technologies to make secondary batteries of electric vehicles contribute to levelling of electric power are known (see Patent Literature 1 explained below, etc., for example).

PRIOR ART LITERATURES

Patent Literatures

Patent Literature 1: Japanese Patent No. 5714073
Patent Literature 2: Japanese Patent No. 5578124

SUMMARY

For a system that performs power transfer between a power network and vehicles provided with batteries, it is desired that a larger number of vehicles are connected to the power network.

BRIEF DESCRIPTION OF THE DRAWINGS

FIG. 4 schematically illustrates one example of a detail screen 400.
FIG. 5 illustrates one example of schedule information in a table format.
FIG. 6 illustrates one example of history information in a table format.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention. Note that the identical or similar portions in drawings are given the same reference numbers, and repetitive explanations are omitted in some cases.

Figure 1:
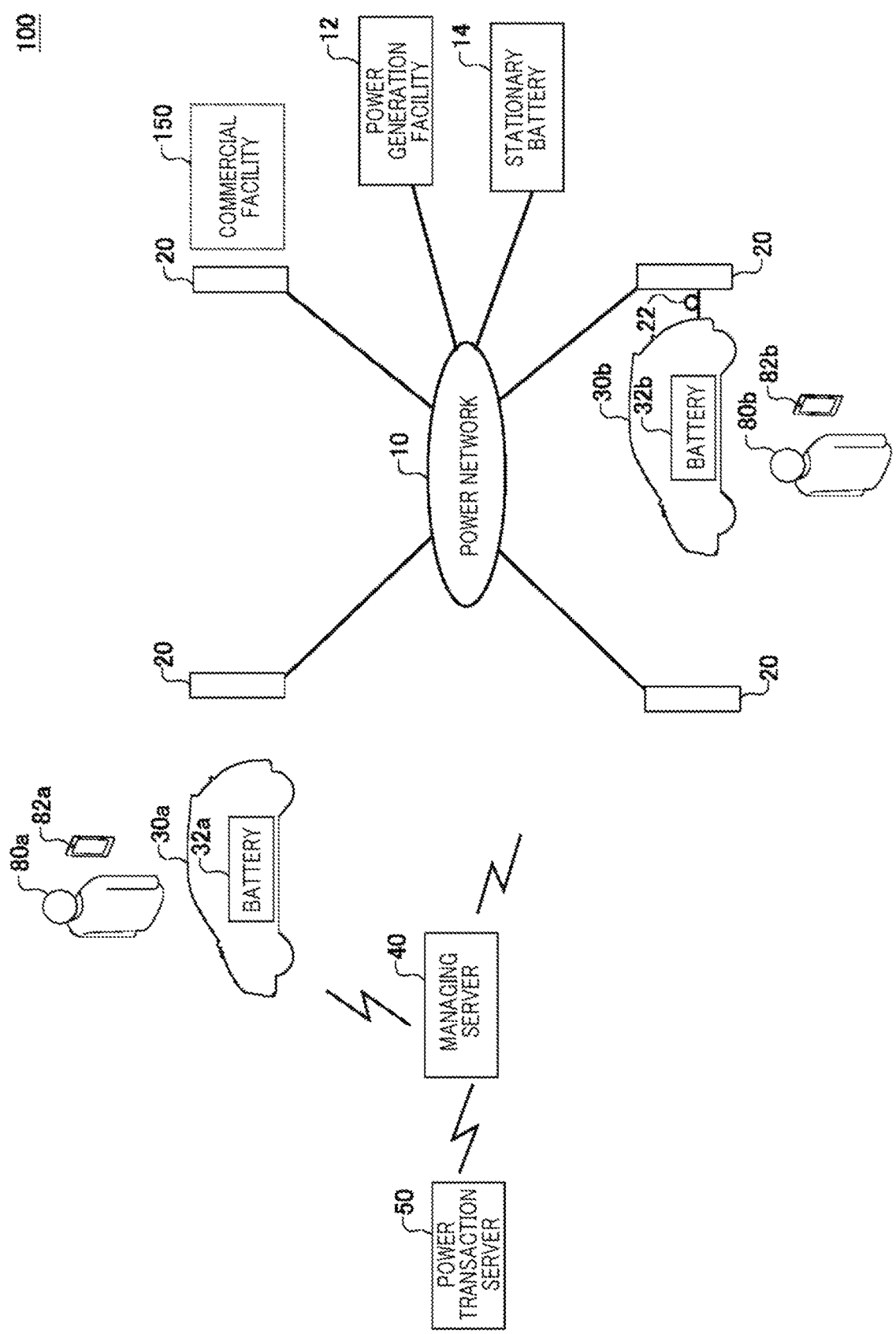
FIG. 1 schematically illustrates the basic configuration of a power transfer system 100.

FIG. 1 schematically illustrates the basic configuration of a power transfer system 100. The power transfer system 100 is a system for a power aggregator, for example, to perform V2G (Vehicle-to-Grid) for exchange of power between vehicles and a power network by using batteries provided to the vehicles. The power transfer system 100 has a function of facilitating connection of a vehicle to a power network. Note that, in V2G, at least either release of power by a vehicle to the power network or reception of power by a vehicle from the power network is performed.

The power transfer system 100 includes: a plurality of vehicles including a vehicle 30a, and a vehicle 30b; a stationary battery 14; a plurality of charge/discharge facilities 20; a managing server 40; a power generation facility 12; and a plurality of user terminals including a user terminal 82a, and a user terminal 82b.

A user 80a, and a user 80b are users of the power transfer system 100. In particular, the user 80a is a user of the vehicle 30a, and the user 80b is a user of the vehicle 30b. Note that a user of a vehicle may be any person who uses the vehicle such as an owner of the vehicle or a family member of the owner. In the present embodiment, the user 80a, and user 80b are generally called a "user 80" in some cases.

The user terminal 82a is a communication terminal used by the user 80a. The user terminal 82b is a communication terminal used by the user 80b. The plurality of user terminals including the user terminal 82a, and user terminal 82b are generally called a "user terminal 82" in some cases.

The user terminal 82 may be a mobile terminal, a personal computer, a vehicle navigation device, or the like, for example. Examples of the mobile terminal include a mobile phone, a smartphone, a PDA, a tablet, a notebook computer, a laptop computer, a wearable computer, and the like.

The vehicle 30a includes a battery 32a. The vehicle 30b includes a battery 32b. In the present embodiment, the plurality of vehicles including the vehicle 30a, and vehicle 30b are generally called a "vehicle 30" in some cases. In addition, a plurality of batteries including the battery 32a, and battery 32b are generally called a "battery 32" in some cases. The battery 32 may be any of various secondary batteries such as lithium ion batteries or nickel hydrogen batteries.

Note that the battery 32 is one example of a driving power source of the vehicle 30. The driving power source includes a power source that, like a fuel cell or the like, consumes a fuel to generate electric energy to be provided to a motive power source of the vehicle 30. The fuel may be hydrogen, a hydrocarbon fuel such as gasoline, light oil or natural gas, an alcohol fuel, or the like. The driving power source may be any power source that can generate electric energy to be provided to a motive power source of the vehicle 30.

The vehicle 30 is one example of a transportation device. The vehicle 30 is a vehicle including a motive power source to be driven by electric energy, such as an electric vehicle or a fuel cell vehicle (FCV), for example. Electric vehicles include a battery electric vehicle (BEV), a hybrid vehicle or plug-in hybrid electric vehicle (PHEV) including an internal combustion engine to provide at least part of motive power. In the present embodiment, the vehicle 30 is an electric vehicle including the battery 32 as a driving power source. In the form employing a battery as a driving power source, battery discharge corresponds to energy release from the driving power source, and battery charge corresponds to energy accumulation in the driving power source.

The managing server 40 is capable of communication with the vehicle 30, stationary battery 14, and user terminal 82 through a communication network. The managing server 40 is also capable of communication with a power transaction server 50 through a communication network. The communication networks may include wired communication or wireless communication transmission paths. The communication networks may include communication networks including the Internet, a P2P network, a dedicated line, a VPN, a power line communication line, a mobile phone line, and the like.

A power network 10 may include a power transmission system or a power distribution system of a power system, or a power transmission network of a power grid. The vehicle 30, stationary battery 14, charge/discharge facility 20, and power generation facility 12 are connected to the power network 10. The power network 10 may be provided for each region. The power network 10 may be a micro grid. The power network 10 may be a power distribution network of any scale that connects power devices that consume power, and power sources. For example, the power network 10 may be a power distribution network provided to any of facilities such as a commercial facility 150. The power network 10 may be provided for each building. The charge/discharge facility 20, stationary battery 14, and power generation facility 12 are capable of power transfer with the power network 10. The charge/discharge facility 20 is one example of power transfer facilities for performing power transfer between the vehicle 30 and the power network 10.

The power generation facility 12 is managed by an electric power company or the like. Charge/discharge facilities 20 include, for example, a charger/discharger installed at a residence, a charge/discharge station installed at a parking lot or public space of a multi-dwelling unit, a building or the commercial facility 150, and the like.

The vehicle 30 may be connected to the charge/discharge facility 20 through a charge/discharge cable 22. That is, the vehicle 30 is connected to the power network 10 through the charge/discharge cable 22, and charge/discharge facility 20. The vehicle 30 performs power transfer between the battery 32 and the power network 10 through the charge/discharge facility 20. For example, the vehicle 30 releases power obtained by discharge of the battery 32 to the power network 10 via the charge/discharge cable 22, and charge/discharge facility 20. In addition, the vehicle 30 charges the battery 32 with power supplied from the power network 10 via the charge/discharge cable 22, and charge/discharge facility 20. Note that transfer of power between an entity and a power network 10 is called "power transfer with the power network 10" and the like in some cases.

The stationary battery 14 is managed by the power aggregator. The battery 32 of the vehicle 30 forms a virtual power plant along with the stationary battery 14. The managing server 40 is managed by the power aggregator. The managing server 40 controls power transfer between the battery 32 and the power network 10, and between the stationary battery 14 and the power network 10.

The managing server 40 performs power transaction by bidding in a wholesale power market. The power transaction server 50 is managed by an operator of the wholesale power market. The length of each time segment is defined as 30 minutes, and the managing server 40 places a bid in the power transaction server 50 in every time segment. The managing server 40 causes the battery 32, and stationary battery 14 to discharge power in each time segment based on a contract result to supply the power to the power network 10.

For example, the managing server 40 causes the battery 32, and stationary battery 14 to discharge power according to a contract amount which is a result of bidding in the wholesale power market by the power aggregator to supply the power network 10 with the power released from the battery 32, and stationary battery 14. In addition, the managing server 40 controls charge/discharge of the battery 32, and stationary battery 14 to balance power supply and demand in the power network 10 to an extent of the balancing power agreed in a transaction which is a result of bidding in the supply/demand balancing market by the power aggregator. For example, the managing server 40 controls charge/discharge of the battery 32, and stationary battery 14 according to an increased-demand response (increased-DR), a decreased-demand response (decreased-DR), and an increased/decreased-demand response (increased/decreased-DR) requested by a power transmission/distribution company or a retail electricity supplier.

Specifically, the managing server 40 controls at least one of the vehicle 30 and the charge/discharge facility 20 according to a increased-DR to thereby charge the battery 32 of the vehicle 30 with power received from the power network 10 through the charge/discharge facility 20. In addition, the managing server 40 controls at least one of the vehicle 30 and the charge/discharge facility 20 according to a decreased-DR to thereby cause the battery 32 of the vehicle 30 to discharge power, and cause the power obtained by the discharge of the battery 32 to be released toward the power network 10 through the charge/discharge facility 20.

In the present embodiment, if a traffic jam occurred or if occurrence of a traffic jam is predicted on a route to a destination where the vehicle 30 is currently travelling, the managing server 40 notifies the user 80 of the vehicle 30 of a second route from the current location to the destination. At this time, the managing server 40 selects, as the second route, a route that goes by a geographical point where a charge/discharge facility 20 is provided, and recommends the user 80 to perform charge and discharge between the vehicle 30 and the power network 10. If the vehicle 30 is connected to the charge/discharge facility 20 at the geographical point notified to the user 80, the managing server 40 gives a consideration to the user 80. This can contribute not only to mitigation of traffic jams, but also to increase of the number of vehicles 30 to be connected to the power network 10. Accordingly, the power aggregator can more easily keep a capacity that is available for power transfer between the vehicle 30 and the power network 10.

Note that, in the present embodiment, power transfer means that power exchange from at least one of the vehicle 30 and the power network 10 to the other occurs. For example, power transfer may mean that power release is performed from the vehicle 30 toward the power network 10. In addition, power transfer may mean that power transmission is performed from the power network 10 toward the vehicle 30. Note that if the vehicle 30 releases power through a charger/discharger installed at a power consumer such as a home, net power supply to the power network 10 does not occur at a connection point between the power consumer's side and the power network 10 when the power consumption on the power consumer's side is greater than the power released from the vehicle 30, and the amount of power supply from the connection point to the power consumer simply decreases in some cases. In this case also, it can be considered that power exchange has occurred with the outside of the power network 10 from the perspective of the power network 10. Accordingly, it does not matter in the present embodiment whether or not the power network 10 receives net power from a particular connection point between the power network 10 and the vehicle 30 in power transfer with the power network 10 in which the vehicle 30 releases power.

Figure 2:
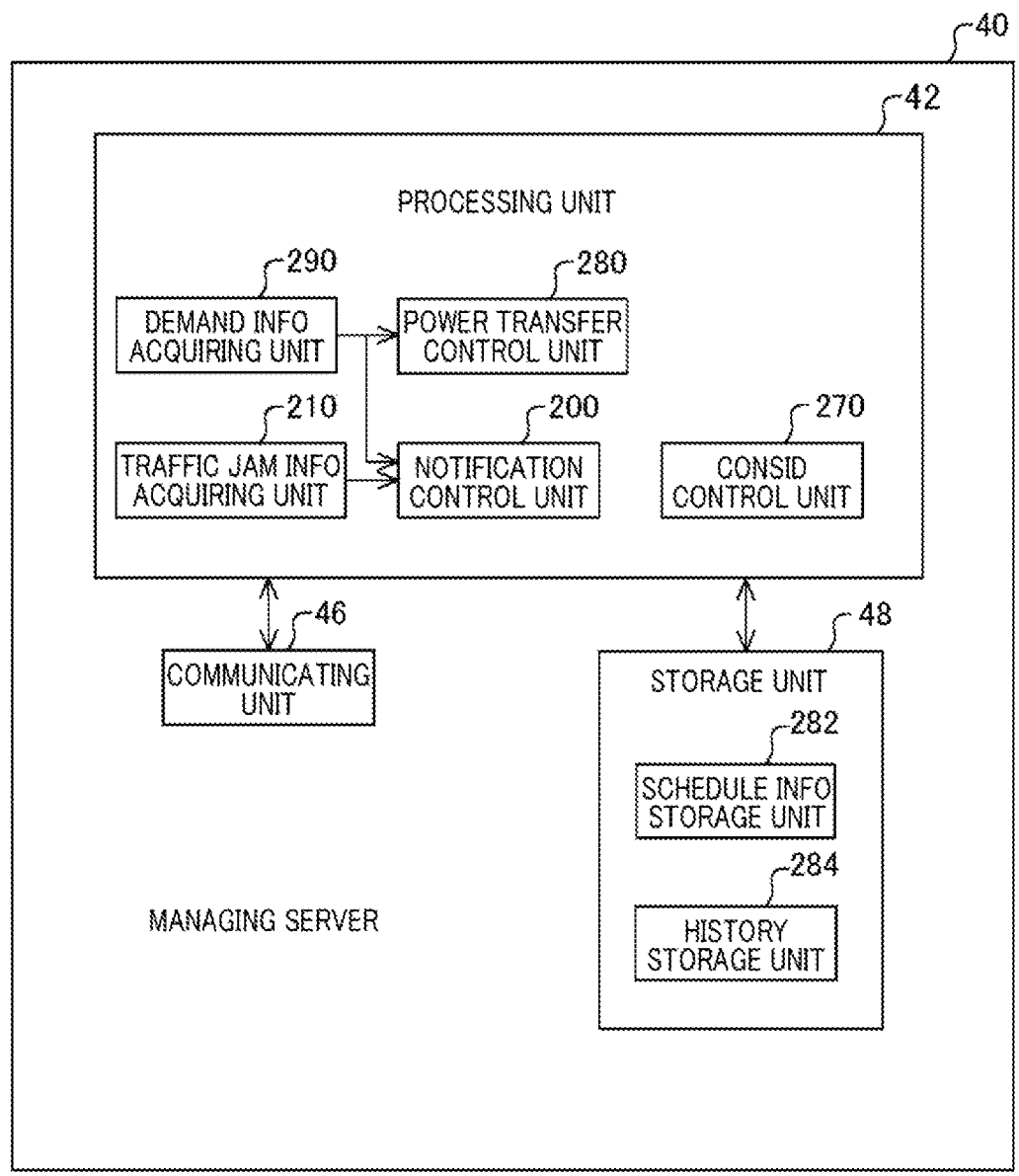
FIG. 2 schematically illustrates the functional configuration of a managing server 40.

FIG. 2 schematically illustrates the functional configuration of the managing server 40. The managing server 40 includes a processing unit 42, a storage unit 48, and a communicating unit 46.

The processing unit 42 is realized by a processing device including a processor. The storage unit 48 is realized by a nonvolatile storage device. The processing unit 42 performs processes by using information stored in the storage unit 48. The communicating unit 46 is responsible for communication with the vehicle 30, stationary battery 14, user terminal 82, and power transaction server 50. Information received by the communicating unit 46 from the vehicle 30, stationary battery 14, user terminal 82, and power transaction server 50 is supplied to the processing unit 42. In addition, information to be sent to the vehicle 30, stationary battery 14, user terminal 82, and power transaction server 50 is generated by the processing unit 42, and sent via the communicating unit 46.

The managing server 40 functions as a power transfer control apparatus. The managing server 40 may be a system realized by one information processing device, or may be a system realized by a plurality of information processing devices.

The processing unit 42 includes a traffic jam information acquiring unit 210, a notification control unit 200, a consideration control unit 270, power transfer, and a demand information acquiring unit 290. The storage unit 48 includes a schedule information storage unit 282, and a history storage unit 284.

The traffic jam information acquiring unit 210 acquires traffic jam information including a position where a traffic jam occurs. The traffic jam information acquiring unit 210 may acquire the traffic jam information by acquiring VICS (registered trademark) (Vehicle Information and Communication System) information.

The notification control unit 200 may make the user 80 of the vehicle 30 notified of information indicating a second route via a geographical point where power transfer can be performed between the vehicle 30 and the power network 10 if a traffic jam occurs on a route allocated to the vehicle 30. Note that the route allocated to the vehicle 30 may be a route where the vehicle 30 is currently travelling, a route that is set as a result of search conducted when the user 80 sets a destination, or the like.

The demand information acquiring unit 290 acquires information indicating power demand in the power network 10. The information indicating power demand may be: information indicating an amount of power supplied from the power network 10 to a power consumer; information indicating an amount of power supplied from the power generation facility 12 to the power network 10; information indicating the power supply/demand balance in the power network 10; information indicating balancing power that should be supplied to the power network 10; and the like.

Note that the contract amount in power transaction mentioned above is one example of the information indicating the power demand. The information indicating the power demand may be a contract price in power transaction or a contract type indicating whether a transaction is a buy contract or a sell contract. In addition, the information indicating the power demand may be information indicating an amount of real-time imbalance between supply and demand in the power network 10 or may be information indicating a predicted value of an amount of future imbalance between supply and demand. The information indicating the power demand may be information indicating a real-time power consumption amount of the power consumer in the power network 10 or a predicted value of the power consumption. Information that can be applied to the information indicating the power demand is not limited to power amounts themselves, but include various types of information that directly or indirectly affects power demand such as temperature information, humidity information, weather information, or event information.

Note that examples of the power transaction market include transaction markets such as a day-ahead market, an intraday market, and a supply/demand balancing power market. Forms that can be applied as the transaction form of power transaction include various transaction forms other than the transaction forms in these power transaction markets.

The notification control unit 200 sets a second route based on the information indicating power demand acquired by the demand information acquiring unit 290, and a power capacity that the battery 32 can supply to the power network 10. The power capacity that the battery 32 can supply to the power network 10 may be the remaining capacity of the battery 32, for example.

If the remaining capacity of the battery 32 is greater than a predetermined value, the notification control unit 200 may set, as the second route, a route via a geographical point where power transfer can be performed with a power network 10 having power demand which is higher than a predetermined first value. If the power capacity that the battery 32 can supply to the power network 10 is smaller than a predetermined value, the notification control unit 200 may set, as the second route, a route via a geographical point where power transfer can be performed with a power network 10 having power demand which is lower than a predetermined second value.

The notification control unit 200 may make the user 80 of the vehicle 30 notified of information indicating how long the user 80 is recommended to stay at the geographical point, along with information indicating the second route. The notification control unit 200 may make the user 80 of the vehicle 30 notified of information indicating a consideration given for the fact that the user 80 selected the second route, along with information indicating the second route. The notification control unit 200 may make the user 80 of the vehicle 30 notified of a consideration that is based on the difference between a distance to be travelled if the vehicle 30 travelled along the second route and a distance to be travelled if the vehicle 30 travelled along the route.

If the user selected the second route, the consideration control unit 270 may associate, with the user, consideration information indicating a consideration for the fact that the user selected the second route. The consideration control unit 270 may associate, with the user, the consideration information indicating the consideration, provided that the vehicle 30 is connected to a power transfer facility for performing power transfer between the vehicle 30 and the power network 10 at the geographical point. Note that the consideration may include a unit price of power transfer between the vehicle 30 and the power network 10. For example, as an indicator of the consideration, a unit price of a fee to be billed according to an amount of power transferred between the vehicle 30 and the power network 10 can be used. Note that the fee of the power amount can be exchanged for any value such as money, virtual currency, electronic money, points, or articles. The unit price indicates the ratio of exchange between transferred unit power and any value. For example, the unit price may be a point count to be charged for or given in exchange for the amount of power of 1 kWh transferred with the power network 10.

If the vehicle 30 is connected to a power transfer facility for performing power transfer between the vehicle 30 and the power network 10, the power transfer control unit 280 may cause power transfer to be performed between the vehicle 30 and the power network 10 according to power demand in the power network 10.

The power transfer control unit 280 communicates with the ECU of the vehicle 30 to successively acquire power transferability information indicating whether or not the vehicle 30 is connected to a charge/discharge facility 20 available for power transfer with the power network 10. If the vehicle 30 is available for power transfer with the power network 10, the power transfer control unit 280 instructs the ECU provided to the vehicle 30 to perform charge/discharge of the battery 32 according to power demand indicated by information acquired by the demand information acquiring unit 290. The ECU of the vehicle 30 communicates with the charge/discharge facility 20 according to the instruction of the power transfer control unit 280, and controls a power converter of the vehicle 30 to perform charge of the battery 32 through the charge/discharge facility 20 or release of power obtained through discharge of the battery 32. Note that the power transfer control unit 280 may successively acquire, from the ECU of the vehicle 30, information indicating: an amount of power input from the charge/discharge facility 20 to the power converter at the time of charge of the battery 32; an amount of power output from the power converter to the charge/discharge facility 20 at the time of discharge of the battery 32; and the SOC (State of Charge) of the battery 32. The power transfer control unit 280 may control power transfer between the vehicle 30 and the power network 10 based on the information acquired from the ECU of the vehicle 30.

Note that functions of the power transfer managing apparatus in the present invention may be realized singly by the managing server 40, may be realized by a combination of the managing server 40 and the ECU of the vehicle 30 or may be realized singly by the ECU of the vehicle 30. For example, at least some of the functions for processes executed by the managing server 40 in the present embodiment may be executed by the ECU of the vehicle 30. For example, at least some of the processes executed by the demand information acquiring unit 290, power transfer control unit 280, traffic jam information acquiring unit 210, notification control unit 200, and consideration control unit 270, and functions of the storage unit 48 may be executed by the ECU of the vehicle 30.

The managing server 40 makes it possible to notify the user 80 of a detour via a geographical point where power transfer is possible with the power network 10 if a traffic jam occurs on a route where the vehicle 30 travels. This can contribute not only to mitigation of traffic jams, but also to increase of the number of vehicles 30 to be connected to the power network 10. Because of this, it becomes easier to keep a capacity that can be transferred between the vehicles 30 and the power network 10.

Figure 3:
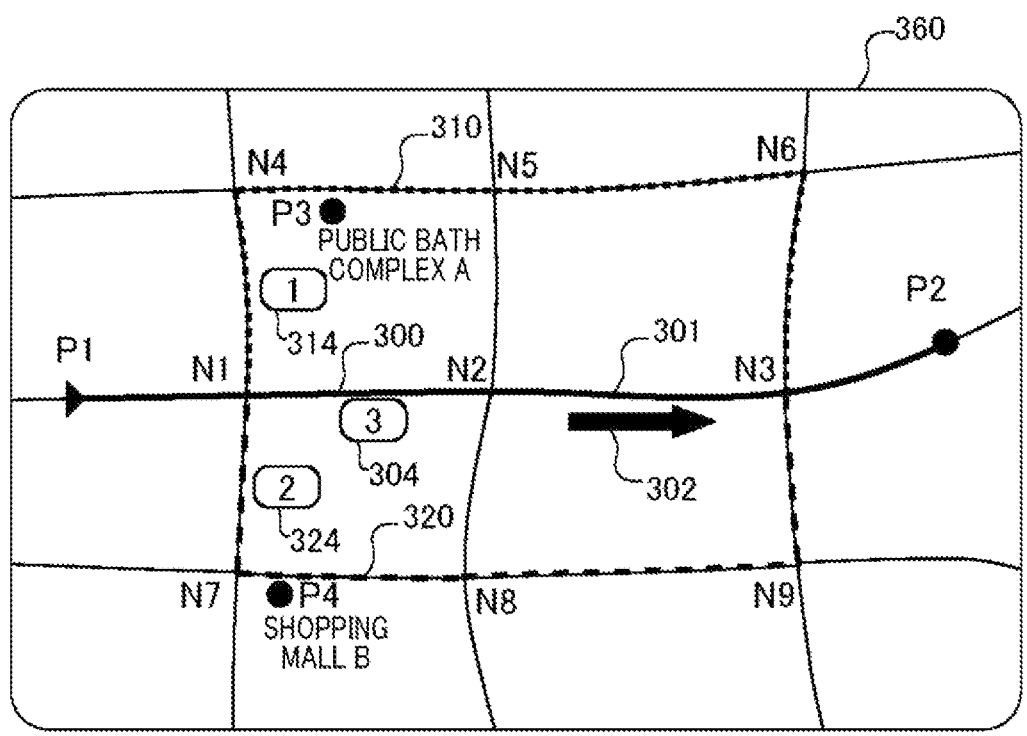
FIG. 3 schematically illustrates one example of a screen 360 displayed on a navigation device.

FIG. 3 schematically illustrates one example of a screen 360 displayed on a navigation device. The screen 360 is displayed on the user terminal 82 as a navigation device of the vehicle 30, based on information from the managing server 40. Note that if a user terminal 82 which is a mobile terminal is used as a navigation device, the screen 360 may be displayed on the mobile terminal based on information from the managing server 40.

In FIG. 3, P1 indicates the current position of the vehicle 30. P2 indicates a destination of the vehicle 30. On the screen 360, the route 300 is a route to the destination P3 that passes through a node N1, a node N2, and a node N3 in this order. The route 300 is the shortest route from the current position to the destination, and is the route where the vehicle 30 is currently travelling. The route 300 is one example of a route currently allocated to the vehicle 30.

If, in the managing server 40, it is detected that a traffic jam occurs or occurred in a segment corresponding to a link 301 between the node N2 and the node N3 based on traffic jam information acquired by the traffic jam information acquiring unit 210, the notification control unit 200 causes a mark 302 indicating a traffic jam to be displayed. Furthermore, the notification control unit 200 identifies a route 310, and a route 320 that are different from the route 300, and causes the route 310, and route 320 to be displayed on the user terminal 82.

The route 310 is a route to the destination that passes through the node N1, a node N4, a node N5, a node N6, and the node N3 in this order. The route 320 is a route to the destination that passes through the node N1, a node N7, a node N8, a node N9, and the node N3 in this order.

In FIG. 3, P3 indicates the position of Public Bath Complex A where a parking lot provided with a charge/discharge facility 20 is provided. P4 indicates the position of Shopping Mall B where a parking lot provided with a charge/discharge facility 20 is provided. If a route to be notified to the user 80 is re-searched for in response to an occurrence of a traffic jam on the current route of the vehicle 30, the notification control unit 200 searches routes to the destination P2 via facilities where charge/discharge facilities 20 are provided, for a route formed by nodes between which a traffic jam will not occur in a time segment in which the vehicle 30 is predicted to pass therethrough assuming that the vehicle 30 leaves a facility where a charge/discharge facility 20 is provided after staying at the facility for a predetermined length of time. The notification control unit 200 causes information indicating the route found by the search to be sent to the user terminal 82.

If display positions of an object 314 corresponding to the route 310, an object 314 corresponding to the route 320, and an object 304 corresponding to the route 300 are touched on the screen 360, the user terminal 82 displays detail screens indicating detailed information of the individual routes.

FIG. 4 schematically illustrates one example of a detail screen 400. The detail screen includes route identification numbers with which routes are identified, route names, distances, required time, and benefit information.

In the column for the route identification numbers, numerical values included in the object 314, object 324, and object 304 on the screen 360 are displayed. In the column for the route names, "Shortest Route" is displayed for the route with the shortest distance to the destination, and route names including the names of commercial facilities 150 to be visited on the way such as "Public Bath Complex A" and "Shopping Mall B" are displayed for routes other than the shortest route. In addition, in the cells where the route names are displayed, objects indicating the degree of recommendation about the routes or objects indicating whether or not the routes are jammed are displayed as attribute information.

In the column for the distances, distances to be travelled if the corresponding routes are selected are displayed. In the column for the required time, estimated required time is displayed. The required time is calculated based on traffic jam information, information about predicted values of speed of the vehicle, and the like. For the routes other than the shortest route, the column for the required time includes objects indicating recommended values of lengths of time of stays at the commercial facilities 150 to be visited on the way.

In the column for the benefits, points to be given to the user 80 if the corresponding routes are selected; selling unit prices or buying unit prices to be applied if the charge/discharge facilities 20 are used; and benefits to be granted if commercial facilities that are present at places to be visited on the way are used such as tickets for public baths or discount vouchers are displayed. The points indicate a point count to be given according to a length of time of a stay at a commercial facility 150. The points can be traded for a commodity or can be used for reduction of the basic usage fee of the monthly fee of a charge/discharge facility 20 to be billed to the user 80.

The selling unit price indicates a unit price to be applied when the user 80 sells power to the power aggregator. The buying unit price indicates a unit price to be applied when the user 80 buys power from the power aggregator. Note that whether the user 80 sells power to a power network 10 of each commercial facility 150 in the power network 10 is set depending on whether or not there is a shortage of power in the power network 10 of the commercial facility 150. Note that since the route 310, and route 320 are longer as compared with the route 300, the buying unit price, and selling unit price to be applied if the route 310 or route 320 is selected may be set lower than, and higher than the regular unit prices, respectively.

Note that the selling unit price of the route 310 may be decided such that at least the increase amount of electricity fee to be borne by the user 80 if the user 80 selected to travel along the route 310, which is longer than the route 300, is cancelled out based on: the difference between the travelled distance of the route 310, and the travelled distance of the route 300; an amount of power to be consumed by the vehicle 30 per unit distance; and a predetermined electricity fee billed for charge per unit power amount. Similarly, the buying unit price of the route 320 may be decided such that at least the increase amount of electricity fee to be borne by the user 80 if the user 80 selected to travel along the route 320, which is longer than the route 300, is cancelled out based on: the difference between the travelled distance of the route 320, and the travelled distance of the route 300; an amount of power to be consumed by the vehicle 30 per unit distance; and a predetermined electricity fee billed for charge per unit power amount.

If the user 80 touches the display position of a route identification number on the detail screen 400, route identification information is sent to the managing server 40. The managing server 40 stores schedule information in the schedule information storage unit 282.

FIG. 5 illustrates one example of schedule information in a table format. The schedule information is stored in the schedule information storage unit 282 at the storage unit 48. The schedule information associates a vehicle ID, a station ID, a scheduled period, points, and a unit price with each other.

As the vehicle ID, identification information of the vehicle 30 is stored. As the station ID, identification information of a station allocated to a parking lot in a commercial facility 150 is stored.

As the scheduled period, information indicating a scheduled period over which the vehicle 30 of the user 80 is kept connected to the charge/discharge facility 20 is stored. As the scheduled period, a period that starts at a timing which is a predetermined length of time before an estimated time at which the vehicle 30 is estimated to arrive at a commercial facility 150 if the vehicle 30 travels along the route, and ends at a timing which is a predetermined length of time after the estimated time is stored. The scheduled period is set so as to cover time during which power transfer is performed between the vehicle 30 and the power network 10 (e.g., "two hours" which is a recommended length of a stay).

As the points, information indicating points per unit time presented to the user 80 on the detail screen 400 illustrated in FIG. 4 is stored. As the unit price, the unit price presented to the user 80 on the detail screen 400 illustrated in FIG. 4 is stored.

FIG. 6 illustrates one example of history information in a table format. The history information is stored in the history storage unit 284 in the storage unit 48. The history information indicates a history of connection of the vehicle 30 to charge/discharge facilities 20. The history information associates a vehicle ID, a station ID, a connection start time, a connection end time, points, a power transfer amount, and a fee with each other.

As the vehicle ID, identification information of the vehicle 30 is stored. As the station ID, identification information of a station to which the vehicle 30 is connected is stored.

As the connection start time, information indicating a time at which the vehicle 30 became available for power transfer with the power network 10 is stored. The connection start time may be identified based on power transferability information sent periodically from the charge/discharge ECU of the vehicle 30 to the managing server 40. As the connection start time, a time at which it became possible for the power transfer control unit 280 to control charge/discharge of the battery 32 after the charge/discharge cable 22 is attached to the vehicle 30, and charge/discharge facility 20 may be stored.

As the connection end time, information indicating a time at which it became impossible to perform power transfer between the vehicle 30 and the power network 10 is stored. The connection end time may be identified based on power transferability information sent periodically from the charge/discharge ECU of the vehicle 30 to the managing server 40. As the connection end time, information indicating an end time of a period over which the vehicle 30 was kept connected to the charge/discharge facility 20 through the charge/discharge cable 22 may be stored. As the connection end time, information indicating a time at which a power cable was disconnected from at least one of the vehicle 30 and the charge/discharge facility 20 may be stored. As the connection end time, information indicating a time at which it became impossible for the power transfer control unit 280 to control charge/discharge of the battery 32 may be stored.

The points indicate a consideration given for the fact that the vehicle 30 became available for power transfer with the power network 10. If the vehicle 30 is connected to a charge/discharge facility 20 of a station identified with a station ID stored in the reservation information, the consideration information generating unit 270 calculates points according to the reservation information, and stores information indicating the points in the history storage unit 284. As mentioned above, according to the points given to the user 80, the basic usage fee of the monthly fee of the charge/discharge facility 20 to be billed to the user 80 may be reduced. For example, if ¥1 is discounted per point in the example illustrated in FIG. 6, the discount amount from the basic usage fee is ¥100.

As the power transfer amount, information indicating an amount of power transferred between the vehicle 30 and the power network 10 from the connection start time to the connection end time is stored. Note that if power is supplied from a vehicle 30 to the power network 10, a negative value is stored as the power transfer amount. If power is supplied from the power network 10 to a vehicle 30, a positive value is stored as the power transfer amount.

As the fee, a fee to be billed to the user 80 for power transfer is stored. If the billing fee is a negative value, it represents that the user 80 sold power to the power aggregator. Billing to the user 80 is performed based on the sum of the basic usage fee of the monthly fee of the charge/discharge facility 20, the billing fee, and the discount amount based on the points mentioned above.

Figure 7:
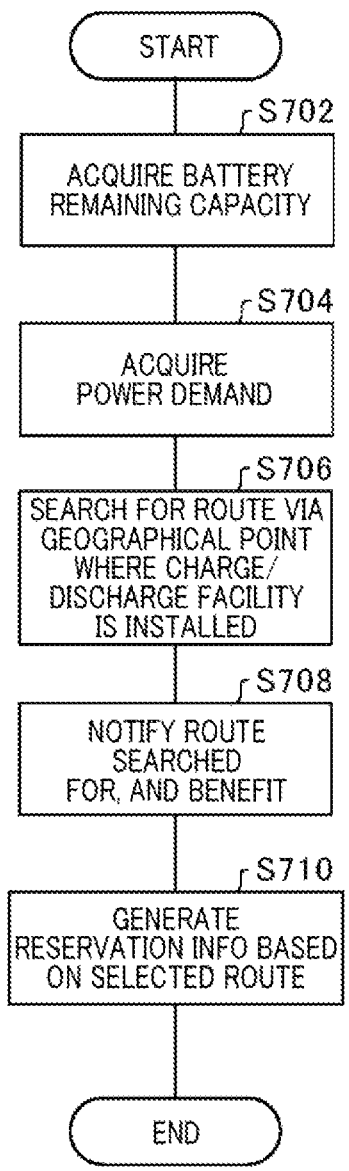
FIG. 7 is a flowchart related to a process of presenting a route to a user 80.

FIG. 7 is a flowchart related to a process of presenting to a user 80 a second route. The processes in the flowchart of FIG. 7 are executed mainly at the processing unit 42 of the managing server 40. The processes in the flowchart of FIG. 7 are started for example if a traffic jam occurred or it is predicted that a traffic jam will occur in a route where the vehicle 30 is currently travelling.

At S702, the notification control unit 200 acquires a remaining capacity of the battery 32 of the vehicle 30. At S704, the demand information acquiring unit 290 acquires power demand in the power network 10 that supplies power in a region or facility in an area within a predetermined distance from the current position of the vehicle 30.

At S706, the notification control unit 200 searches for a route via a geographical point where a charge/discharge facility 20 is installed. At this time, if the remaining capacity of the battery 32 of the vehicle 30 is larger than a predetermined first remaining capacity, the notification control unit 200 may search for a route via a geographical point to be visited on the way where power is supplied from a power network 10 having a power demand amount larger than a predetermined first power amount. On the other hand, if the remaining capacity of the battery 32 of the vehicle 30 is smaller than a predetermined second remaining capacity smaller than the first remaining capacity, the notification control unit 200 may search for a route via a geographical point to be visited on the way where power is supplied from a power network 10 having a power demand amount which is smaller than a predetermined second power amount. Thereby, a place to be visited on the way where a power network 10 having a large power demand amount supplies power can be presented to a user 80 of a vehicle 30 provided with a battery 32 having a large remaining capacity, and a place to be visited on the way where a power network 10 having a small power demand amount supplies power can be presented to a user 80 of a vehicle 30 provided with a battery 32 having a small remaining capacity. Note that if the remaining capacity of the battery 32 of the vehicle 30 is between the second remaining capacity and the first remaining capacity, a route via a geographical point to be visited on the way where any power network 10 that is available for power transfer with the vehicle 30 supplies power may be searched for irrespective of whether or not power demand amounts are large.

At S708, the notification control unit 200 notifies the user 80 of the route searched for at S706, and information indicating benefits. Specifically, information including: node and link information indicating the route searched for at S706; information indicating points explained with reference to FIG. 4, and the like; information indicating a selling unit price or buying unit price; and information indicating benefits available at the commercial facility 150 to be visited on the way is sent to the user terminal 82. If the user terminal 82 receives the information, it becomes possible for the user terminal 82 to display the screen 360 illustrated in FIG. 3, and display the detail screen 400 according to manipulation by the user 80. If the user 80 selects one route on the detail screen 400 displayed on the user terminal 82, information including a route identification number selected by the user 80 is sent to the managing server 40.

If the processing unit 42 receives the route identification information from the user terminal 82, at S710, the processing unit 42 generates reservation information illustrated in FIG. 5 according to the route identification information selected by the user 80, and stores the reservation information in the schedule information storage unit 282.

Note that the processes in this flowchart may be executed not only if a traffic jam occurred on a route where the vehicle 30 is currently travelling, but also when a destination is set for the vehicle 30. For example, the processes may be executed if the shortest route from the current position of the vehicle 30 to the destination is jammed or it is predicted that a traffic jam will occur on the shortest route when a destination is initially set for the vehicle 30.

As explained above, the managing server 40 makes it possible to present a detour to the user 80, and prompt the user 80 to perform power transfer with the power network 10 if a route where the vehicle 30 is travelling is or will be jammed. This can contribute not only to suppression of traffic jams, but also to increase of the number of vehicles 30 to be connected to the power network 10.

Figure 8:
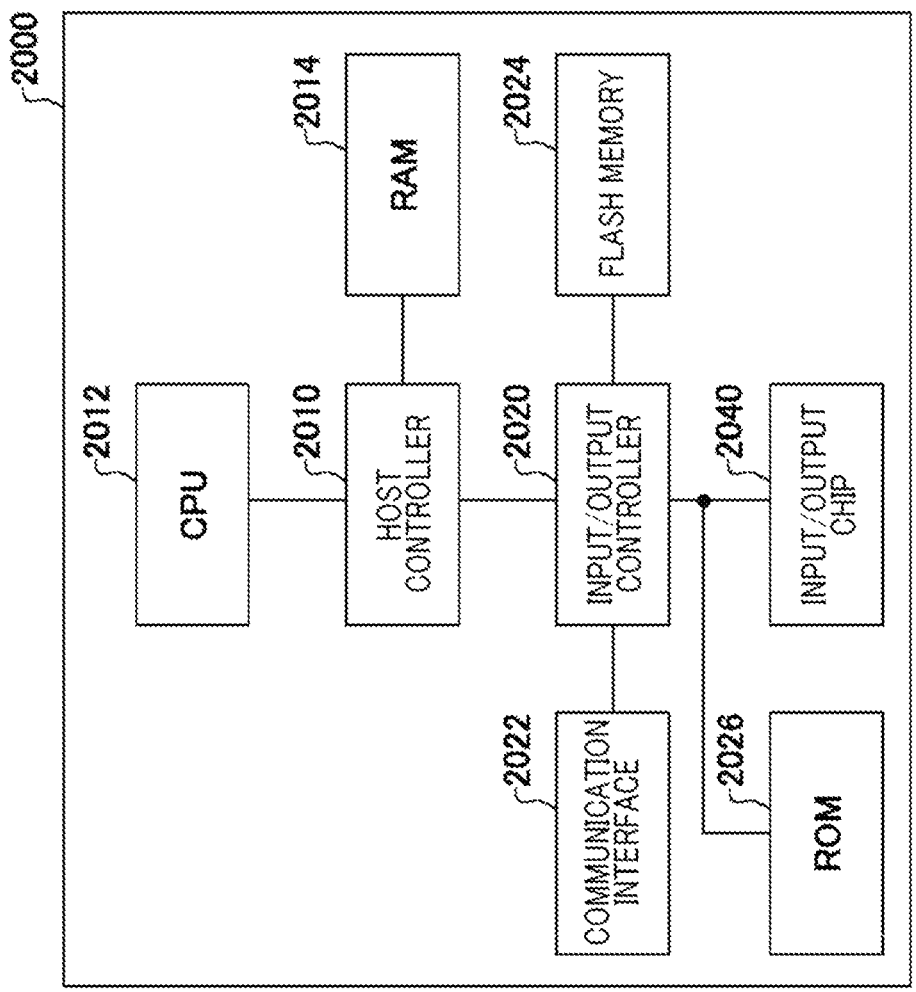
FIG. 8 shows an example of a computer 2000 in which embodiments of the present invention may be wholly or partly embodied.

FIG. 8 shows an example of a computer 2000 in which embodiments of the present invention may be wholly or partly embodied. A program that is installed in the computer 2000 can cause the computer 2000 to function as or perform operations associated with apparatuses such as the managing server 40 of the embodiments or sections thereof, and/or cause the computer 2000 to perform processes of the embodiments of the present invention or steps thereof. Such a program may be executed by the CPU 2012 to cause the computer 2000 to perform certain operations associated with some or all of the blocks of flowcharts and block diagrams described herein.

The computer 2000 according to the present embodiment includes a CPU 2012, and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via the input/output controller 2020.

The CPU 2012 operates according to programs stored in the ROM 2026 and the RAM 2014, thereby controlling each unit.

The communication interface 2022 communicates with other electronic devices via a network. The flash memory 2024 stores programs and data used by the CPU 2012 within the computer 2000. The ROM 2026 stores therein a boot program or the like executed by the computer 2000 at the time of activation, and/or a program depending on the hardware of the computer 2000. The input/output chip 2040 may also connect various input/output units such as a keyboard, a mouse and a monitor to the input/output controller 2020 via an input/output port such as a serial port, a parallel port, a keyboard port, a mouse port, a monitor port, a USB port, an HDMI (registered trademark) port and the like.

A program is provided via a computer-readable medium such as a CD-ROM, a DVD-ROM, or a memory card or a network. The RAM 2014, the ROM 2026, or the flash memory 2024 is an example of the computer-readable medium. The program is installed in the flash memory 2024, the RAM 2014, or the ROM 2026, and is executed by the CPU 2012. The information processing described in these programs is read into the computer 2000, resulting in cooperation between a program and the above-mentioned various types of hardware resources. An apparatus or method may be constituted by realizing the operation or processing of information in accordance with the usage of the computer 2000.

For example, when communication is performed between the computer 2000 and an external device, the CPU 2012 may execute a communication program loaded onto the RAM 2014 to instruct communication processing to the communication interface 2022, based on the processing described in the communication program. The communication interface 2022, under control of the CPU 2012, reads transmission data stored on a transmission buffering region provided in a recording medium such as the RAM 2014, the hard disk drive 2024, the DVD-ROM 2001, or the IC card, and transmits the read transmission data to a network or writes reception data received from a network to a reception buffering region or the like provided on the recording medium.

In addition, the CPU 2012 may cause all or a necessary portion of a file or a database to be read into the RAM 2014, the file or the database having been stored in an external recording medium such as the flash memory 2024, and perform various types of processing on the data on the RAM 2014. The CPU 2012 may then write back the processed data to the external recording medium.

Various types of information, such as various types of programs, data, tables, and databases, may be stored in the recording medium to undergo information processing. The CPU 2012 may perform various types of processing on the data read from the RAM 2014, which includes various types of operations, processing of information, condition judging, conditional branch, unconditional branch, search/replace of information, etc., as described throughout this disclosure and designated by an instruction sequence of programs, and writes the result back to the RAM 2014. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The program or software module explained above may be stored on the computer 2000 or a computer-readable medium located near the computer 2000. A recording medium like a hard disk or a RAM provided in a server system connected to a dedicated communication network or the Internet can be used as such a computer-readable medium. The program stored on the computer-readable medium may be provided to the computer 2000 via a network.

The programs that are installed on the computer 2000, and make the computer 2000 function as the managing server 40 may act on the CPU 2012 or the like to make the computer 2000 function as each unit of the managing server 40. Information processing described in these programs are read in by the computer 2000 to thereby make the computer 2000 function as the traffic jam information acquiring unit 210, notification control unit 200, consideration control unit 270, power transfer control unit 280, demand information acquiring unit 290, schedule information storage unit 282, and history storage unit 284, which are specific means attained by cooperation between software and various types of hardware resources mentioned above. With these specific means, the unique managing server 40 corresponding to a purpose of use of the computer 2000 in the present embodiment can be constructed by realizing operations on or processing of information corresponding to the purpose of use.

Various embodiments of the present invention may be described with reference to block diagrams and the like whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises at least part of an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing device, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. In addition, matters explained about a particular embodiment can be applied to another embodiment as long as such application does not cause technological contradictions. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: power network
12: power generation facility
14: stationary battery
20: charge/discharge facility
22: charge/discharge cable
30: vehicle
32: battery
40: managing server
42: processing unit
46: communicating unit
48: storage unit
50: power transaction server
80: user
82: user terminal
100: power transfer system
150: commercial facility
200: notification control unit
210: traffic jam information acquiring unit
270: consideration control unit
280: power transfer control unit
282: schedule information storage unit
284: history storage unit
290: demand information acquiring unit
300: route
301: link
302: mark
304, 314, 324: object
310, 320: route
360: screen
400: detail screen
2000: computer
2010: host controller
2012: CPU
2014: RAM
2020: input/output controller
2022: communication interface
2024: flash memory
2026: ROM
2040: input/output chip

What is claimed is:

1. A power transfer managing apparatus comprising:
a processor;
a traffic jam information acquiring unit that uses the processor to acquire traffic jam information including a position where a traffic jam occurs;
a notification control unit that uses the processor to make a user of a vehicle that is provided with a battery as the driving power source notified of information indicating a second route via a geographical point where power transfer can be performed between the battery and an electric power grid on condition that the traffic jam occurs on a first route allocated to the vehicle; and
a demand information acquiring unit that uses the processor to acquire information indicating power demand in the electric power grid, wherein
the notification control unit uses the processor to set the second route based on the information indicating the power demand and a power capacity that the battery can supply to the electric power grid.

2. The power transfer managing apparatus according to claim 1, wherein if the power capacity that the battery as the driving power source can supply to the electric power grid is greater than a predetermined value, the notification control unit uses the processor to set, as the second route, a route via a geographical point where power transfer can be performed with the electric power grid having power demand which is higher than a predetermined first value.

3. The power transfer managing apparatus according to claim 1, wherein if the power capacity that the battery as the driving power source can supply to the electric power grid is lower than a predetermined value, the notification control unit uses the processor to set, as the second route, a route via a geographical point where the power transfer can be performed with the electric power grid having power demand which is lower than a predetermined second value.

4. The power transfer managing apparatus according to claim 1, wherein the notification control unit uses the processor to make the user of the vehicle notified of information indicating time during which the vehicle is recommended to stay at the geographical point, along with information indicating the second route.

5. The power transfer managing apparatus according to claim 1, wherein the notification control unit uses the processor to make the user of the vehicle notified of information indicating a consideration to be given for the second route being selected, along with the information indicating the second route.

6. The power transfer managing apparatus according to claim 5, wherein the notification control unit uses the processor to make the user of the vehicle notified of a consideration that is based on a difference between a distance to be travelled if the vehicle travels along the second route and a distance to be travelled if the vehicle travels along the first route.

7. The power transfer managing apparatus according to claim 1, further comprising a consideration control unit that uses the processor to associate, with the user, consideration information indicating a consideration for a fact that the user selects the second route.

8. The power transfer managing apparatus according to claim 7, wherein the consideration control unit uses the processor to associate, with the user, the consideration information indicating the consideration, provided that the vehicle is connected to a power transfer facility for performing power transfer between the battery of the vehicle and the electric power grid at the geographical point.

9. The power transfer managing apparatus according to claim 6, wherein the consideration includes a unit price of a fee to be billed according to an amount of power transferred between the battery of the vehicle and the electric power grid.

10. The power transfer managing apparatus according to claim 1, further comprising a power transfer control unit that uses the processor to cause power transfer to be performed between the battery of the vehicle and the electric power grid according to power demand in the electric power grid if the vehicle is connected to a power transfer facility for performing power transfer between the battery of the vehicle and the electric power grid.

11. A non-transitory computer-readable storage medium having stored thereon a program for causing a computer to function as:

a traffic jam information acquiring unit that acquires traffic jam information including a position where a traffic jam occurs; and a notification control unit that makes a user of a vehicle that is provided with a battery as the driving power source notified of information indicating a second route via a geographical point where power transfer can be performed between the battery and an electric power grid on condition that the traffic jam occurs on a first route allocated to the vehicle; and a demand information acquiring unit that acquires information indicating power demand in the electric power grid, wherein the notification control unit sets the second route based on the information indicating the power demand and a power capacity that the battery can supply to the electric power grid.

\* \* \* \* \*